United States Patent

[11] 3,624,076

[72] Inventors Karl-H. Weber
    Gau-Algesheim;
    Karl Zeile, Ingelheim/Rhine; Rolf
    Giesemann, Bingen/Rhine; Peter B.
    Danneberg, Ingelheim/Rhine, all of
    Germany
[21] Appl. No. 819,940
[22] Filed Apr. 28, 1969
[45] Patented Nov. 30, 1971
[73] Assignee Boehringer Ingelheim GmbH
    Ingelheim am Rhine, Germany
[32] Priority Apr. 29, 1968
[33] Austria
[31] A4165/68

[54] 1-ACYL-5-PHENYL-1H-1,5-BENZODIAZEPINE-2,4-[3H,5H]-DIONES
    17 Claims, No Drawings
[52] U.S. Cl.................................................. 260/239.3,
                                                        424/244
[51] Int. Cl....................................................... C07d 53/04
[50] Field of Search.......................................... 260/239.3
                                                              BI

[56] References Cited
    OTHER REFERENCES
Buchi et al. " Helv. Chim. Acta" Vol. 39, pages 957– 965 (1956)

Primary Examiner—Henry R. Jiles
Assistant Examiner—Robert T. Bond
Attorney—Hammond & Littell ABSTRACT: 1-Acyl-5-phenyl-1H-1,5-benzodiazepine-2,4-[3H,5H]-diones of the formula

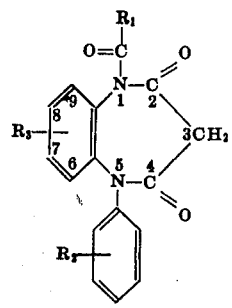

wherein $R_1$ is hydrogen, straight-chain alkyl of one to 15 carbon atoms, halomethyl, methylamino, alkoxy of one to two carbon atoms, cyclohexyl, phenyl, halophenyl, methylphenyl, methoxyphenyl, nitrophenyl, benzyl, styryl or a five-membered heterocyclic ring comprising a sulfur or oxygen atom,
$R_2$ is hydrogen, halogen, methyl or methoxy, and
$R_3$ is hydrogen or halogen, methyl or trifluoromethyl in the 7- or 8-position,
which are useful as psychosedatives, muscle relaxants and anticonvulsives in warm-blooded animals.

1-ACYL-5-PHENYL-1H-1,5-BENZODIAZEPHINE-2,4-[3H,5H]-DIONES

This invention relates to novel 1-acyl-5-phenyl-1H-1,5-benzodiazepine-2,4-[3H,5H]-diones, as well as to a method of preparing them.

More particularly, the present invention relates to a novel 1-acyl-5-phenyl-1H-1,5-benzodiazepine-2,4-[3H,5H]-diones of the formula

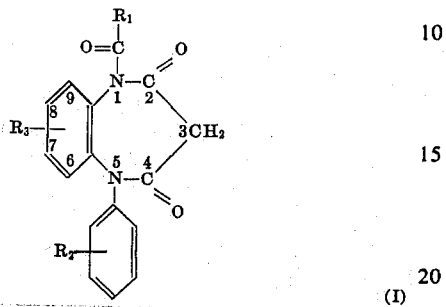

(I)

wherein
$R_1$ is hydrogen, straight-chain alkyl of one to 15 carbon atoms, halomethyl, methylamino, alkoxy of one to two carbon atoms, cyclohexyl, phenyl, halophenyl, methylphenyl, methoxyphenyl, nitrophenyl, benzyl, styryl or a five-membered heterocyclic ring comprising a sulfur or oxygen atom,
$R_2$ is hydrogen, halogen, methyl or methoxy, and
$R_3$ is hydrogen or halogen, methyl or trifluoromethyl in the seven- or eight-position.

The compounds embraced by formula I above may be prepared by acylation of a compound of the formula ps

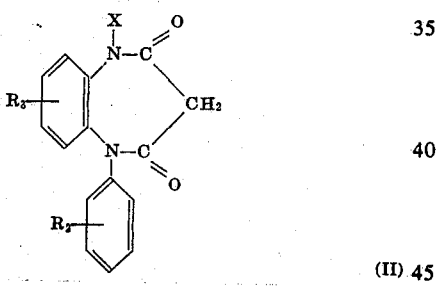

(II)

wherein $R_2$ and $R_3$ have the same meanings as in formula I and X is hydrogen or an alkali metal, in the one-position. The acylation may be effected with a common acylating agent, such as an acid halide, an acid anhydride or an isocyanate, pursuant to customary methods and under reaction conditions which are usually applied to acylation reactions.

The starting compounds of the formula II, in turn, may be prepared as described in copending application Ser. No. 703,188, filed Feb. 5, 1968, that is, by cyclization of an N-phenyl-N-(2-aminophenyl)-malonic acid alkyl ester amide of the formula

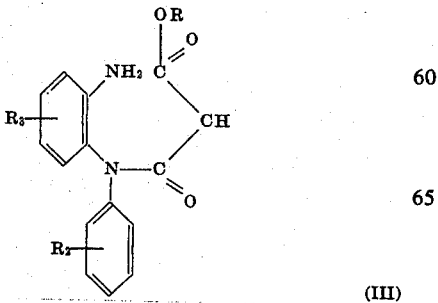

(III)

wherein R is lower alkyl and $R_2$ and $R_3$ have the same meanings as in formula I. The hydrolysis and ring closure proceed smoothly and with good yields in an acid as well as an alkaline medium, preferably in the presence of an alcoholic or aqueous alcoholic solvent; however, other inert solvents such as tetrahydrofuran or dioxan, are also suitable; for acid cyclization, acetonitrile may also be used as the solvent.

Mineral acids, and particularly hydrohalic acids, such as hydrochloric acid, hydrobromic acid, hydroiodic acid, sulfuric acid, phosphoric acid and perchloric acid are preferably used as acid cyclization agents. Examples of alkaline cyclization agents are sodium alcoholates and alkali metal hydroxides.

The reaction periods depend upon the quantity of acid or alkali employed and upon the type of solvent used; they vary between several hours and several days. The reaction temperatures are preferably between +20° C. and the boiling point of the solvent which is used.

Examples of compounds of the formula I which may be obtained by the above-described method are the following:

7-chloro-1-formyl-5-phenyl-1H-1,5-benzodiazepine-2,4-[3H,5H]-dione, 1-acetyl-7-chloro-5-phenyl-1H-1,5-benzodiazepine-2,4-[3H,5H]-dione, 7-chloro-5-phenyl-1-propionyl-1H-1,5-benzodiazepine-2,4-[3H,5H]-dione, 7-chloro-1-chloroacetyl-5-phenyl-1H-1,5-benzodiazepine-2,4-[3H,5H]-dione, 7-chloro-5-phenyl-1-trifluoroacetyl-1H-1,5-benzodiazepine-2,4-[3H,5-dione, 7-chloro-1-cyclohexyl-carbonyl-5-phenyl-1H-1,5-benzodiazepine-2,43H,5H]-dione, 1-benzoyl-7-chloro-5-phenyl-1H-1,5-benzodiazepine-2,4-[3H,5H]-dione, 1-benzoyl-7-bromo-5-phenyl-1H-1,5-benzodiazepine-2,4-[3H,5H,]-dione, 1-benzoyl-8-methyl-5-phenyl-1H-1,5-benzodiazepine-2,4-[3H,5H]-dione, 1-benzoyl-5-(p-methoxyphenyl)-1H-1,5-benzodiazepine-2,4-[3H,5H]-dione, 1-benzoyl-5-phenyl-8-trifluoromethyl-1H-1,5-benzodiazepine-2,4-[3H,5H]-dione, 1-benzoyl-7-chloro-5-(p-methylphenyl)-1H-1,5-benzodiazepine-2,4-[3H,5H]-dione, 1-benzoyl-7-chloro-5-(p-chlorophenyl)-1H-1,5-benzodiazepine-2,4-[3H,5H]-dione, 1-benzoyl-5-phenyl-7-trifluoromethyl-1H-1,5-benzodiapepine-2,4[3H,5H]-dione, 7-chloro-1-(o-methylbenzoyl)-5-phenyl-1H-1,5-benzodiazepine-2,4-[3H,5H]-dione, 7-chloro-1-(p-methylbenzoyl)-5-phenyl-1H-1,5-benzodiazepine-2,4-[3H,5H]-dione, 7-chloro-1-(o-fluorobenzoyl)-5-phenyl-1H-1,5-benzodiazepine-2,4-[3H,5H]-dione, 7-chloro-1-(p-nitrobenzoyl)-5-phenyl-1H-1,5-benzodiazepine-2,4-[3H,5H]-dione, 7-chloro-1-(3,4-dimethoxybenzoyl)-5-phenyl-1H-1,5-benzodiazepine-2,4-[3H,5H]-dione, 7-chloro-1-(2,4-dichlorobenzoyl)-5-phenyl-1H-1,5-benzodiazepine-2,4-[3H,5H]-dione, 7-chloro-5-phenyl-1-phenylacetyl-1H-1,5-benzodiazepine-2,4[3H,a5H]-dione, 7-chloro-1-cinnamoyl-5-phenyl-1H-1,5-benzodiazepine-2,4-[3H,5H]-dione, 7-chloro-1-furoyl-5-phenyl-1H-1,5-benzodiazepine-2,4-[3H,5H]-dione, 7-chloro-5-phenyl-1-thenoyl-1H-1,5-benzodiazepine-2,4-[3H,5H]-dione, 1-ethoxy-carbonyl-7-chloro-5-phenyl-1H-1,5-benzodiazepine-2,4-[3H,5H]-dione, 7-chloro-1-methylcarbamoyl-5-phenyl-1H-1,5-benzodiazepine-2,4-[3H,5H]-dione, 7-chloro-1-lauroyl-5-phenyl-1H-1,5-benzodiazepine-2,4-[3H,5H]dione, 7-chloro-1-palmitoyl-5-phenyl-1H-1,5-benzodiazepine-2,4-[3H,5H]-dione and 1-benzoyl-5-phenyl-7-trifluoromethyl-1H-1,5-benzodiazepine-2,4-[3H,5H]-dione.

The following examples further illustrate the present invention and will enable others skilled in the art to understand it more completely. It should be understood, however, that the invention is not limited solely to the particular examples given below.

EXAMPLE 1

1-Benzoyl-7-chloro-5-phenyl-1H-1,5-benzodiazepine-2,4-[3H,5H]-dione 0.5 mol (154 g.) of the sodium salt of 7-chloro-5-phenyl-1H-1,5-benzodiazepine-2,4-[3H,5H]-dione were dissolved in 2 liters of tetrahydrofuran, and the solution was admixed at room temperature with 60 ml. of benzoylchloride. The mixture was refluxed for 3 hours, then evaporated, and the residue was taken up in methylenechloride. Undissolved starting material was vacuum-filtered off, and the filtrate was extracted with 300 to 500 ml. of cold water. The methylenechloride phase was dried with anhydrous magnesium sulfate and evaporated, and the residue was recrystallized twice from toluene. 110 g. (55 percent of theory) of 1-benzoyl-7-chloro-5-phenyl-1H-1,5-benzodiazepine-2,4-[3H,5H]-dione, m.p. 208°–209° C., of the formula

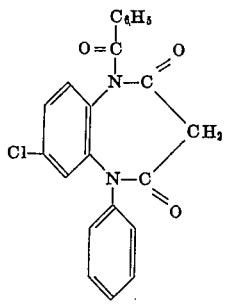

were obtained. The starting material was prepared as follows: 23 g. of sodium were dissolved in 2.3 liters of absolute alcohol, and 230 g. of N-(2-amino-5-chlorophenyl)-N-phenyl-malonic acid ethyl ester amide were added to the solution. After 5 hours' stirring at room temperature, the precipitated sodium salt was vacuum-filtered off, washed with cold alcohol and ether, and dried at 120° C. Yield: 200 g. (93 percent of theory).

EXAMPLE 2

1-Benzoyl-7-chloro-5-phenyl-1H-1,5-benzodiazepine-2,4-[3H,5H]-dione 0.5 mol (143 g.) of 7-chloro-5-phenyl-1H-1,5-benzodiazepine-2,4-[3H,5H]-dione were suspended in 2.5 liters of dry tetrahydrofuran and, after addition of 24 g. of a 50 percent sodium hydride suspension in mineral oil, the mixture was stirred at room temperature until everything had dissolved completely (about 1 hour). Thereafter, 122 g. of benzoic acid anhydride were added to the solution, and the mixture was refluxed for 10 minutes. The reaction mixture was worked up as described in example 1, and the raw product was recrystallized from toluene. 50 g. (25 percent of theory) of 1-benzoly-7-chloro-5-phenyl-1H-1,5-benzodiazepine-2,4-[3H,5H]-dione, m.p. 208°–209°C., were obtained.

EXAMPLE 3

7-Chloro-5-phenyl-1-propionyl-1H-1,5-benzodiazepine-2,4-[3H,5]-dione 0.1 mol (28.6 g.) of 7-chloro-5-phenyl-1H-1,5-benzodiazepine-2,4-[3H,5H]-dione were suspended in 750 ml. of absolute tetrahydrofuran, and the suspension was stirred with 5 g. of a 50 percent sodium hydride suspension in mineral oil for 2 hours at room temperature. After everything had dissolved, 13 g. of propionic acid anhydride were added, the mixture was first stirred for 2 hours at room temperature and then refluxed. After evaporation of the reaction solution in vacuo, the residue was taken up in methylene chloride, the insoluble matter was vacuum-filtered off, and the filtrate was washed with water, and evaporated, and the residue was recrystallized from toluene. 29 g. (90 percent of theory) of 7-chloro-5-phenyl-1-propionyl-1H-1,5-benzodiazepine-2,4-[3H,5]-dione, m.p. 194°–196° C., of the formula

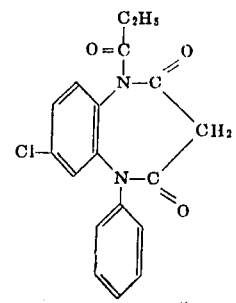

were obtained.

EXAMPLE 4

7-Chloro-5-phenyl-1-propionyl-1H-1,5-benzodiazepine-2,4-[3H,5H]-dione 0.1 mol (28.6 g.) of 7-chloro-5-phenyl-1H-1,5-benzodiazepine-[3H,5H]-dione were refluxed with 200 ml. of pyridine and 18 g. of propionic acid anhydride for 22 hours. Thereafter, the solution was evaporated in vacuo, and the raw product was worked up as described in example 1. Yield: 25.8 g. (80 percent of theory), m.p. 194°–196°C.

EXAMPLE 5

7-Chloro-5-phenyl-1-propionyl-1H-1,5-benzodiazepine-2,4-[3H,5H]-dione 0.1 mol (28.6 g.) of 7-chloro-5-phenyl-1H-1,5-benzodiazepine-2,4-[3H,5H]-dione were refluxed with 300 ml. of propionic acid anhydride for 15 hours. Subsequently, the reaction solution was evaporated in vacuo, the residue was taken up in methylenechloride, and the reaction product was isolated as described in example 1. Yield: 25.8 g. (80 percent of theory), m.p. 194°–196°C.

EXAMPLE 6

7-Chloro-1-methylcarbamoyl-5-phenyl-1H-1,5-benzodiazepine-2,4-[3H,5H]-dione 0.1 mol (28.6 g.) of 7-chloro-5-phenyl-1H-1,5-benzodiazepine-2,4-[3H,5H]-dione were stirred with 850 ml. of absolute dioxane, 30 ml. of methylisocyanate and 1.5 ml. of triethylamine for 15 hours at 40° C. Thereafter, the reaction solution was evaporated in vacuo, water was added to the residue, the crystals formed thereby were vacuum-filtered off, and the filter cake was recrystallized from methylenechloride/diisopropylether. 30 g. (89 percent of theory) of 7-chloro-1-methylcarbamoyl-5-phenyl-1H-1,5-benzodiazepine-2,4 -[3 H, 5 H]-dione, m. p. 306°–308° C., of the formula

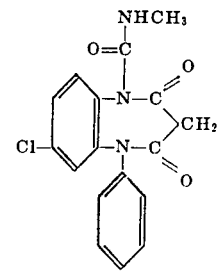

were obtained.

EXAMPLE 7

7-Chloro-5-phenyl-1-propionyl-1H-1,5-benzodiazepine-2,4-[3H,5H]-dione 0.1 mol (28.6 g.) of 7-chloro-5-phenyl-1H-1,5-benzodiazepine-2,4-[3H,5H]-dione were refluxed with 20 g. of propionic acid anhydride in 480 ml. of xylene for 72 hours. The reaction solution was allowed to cool and was then vacuum-filtered; 20 g. of the starting material were recovered as the filter cake. By evaporating the filtrate 6 g. (19 percent of theory) of the reaction product, m.p. 194°–196° C., were isolated.

Using a procedure analogous to that described in the preceding examples, the following additional compounds of the formula I above were prepared:

EXAMPLE 8

7-Chloro-5-phenyl-1-ethoxycarboxyl-1H-1,5-benzodiazepine-2,4-[3H,5H]-dione, m.p. 187°–188° C., of the formula

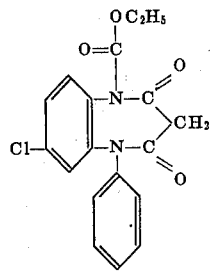

from 7-chloro-5-phenyl-1H-1,5-benzodiazepine-2,4-[3H,5H]-dione and ethoxycarbonyl chloride.

EXAMPLE 9

7-Chloro-5-phenyl-1-formyl-1H-1,5-benzodiazepine-2,4-[3H,5H]-dione, m.p. 210°–211° C., of the formula

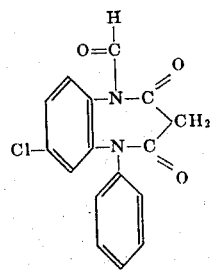

from 7-chloro-5-phenyl-1H-1,5-benzodiazepine-2,4-[3H,5H]-dione and formyl chloride.

EXAMPLE 10

7-Chloro-5-phenyl-1-(o-chloro-benzoyl)-1H-1,5-benzodiazepine-2,4-[3H,5H]-dione, m.p. 222°–224° C., of the formula

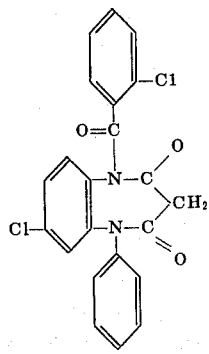

from 7-chloro-5-phenyl-1H-1,5-benzodiazepine-2,4-[3H,5H]-dione and o-chloro-benzoyl chloride.

EXAMPLE 11

7-Chloro-5-phenyl-1-(o-methyl-benzoyl)-1H-1,5-benzodiazepine-2,4-[3H,5H]-dione, m.p. 197°– ° C., of the formula

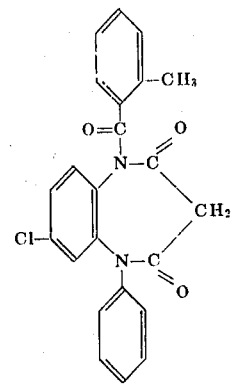

from 7-chloro-5-phenyl-1H-1,5-benzoiazepine-2,4-[3H,5H]-dione and o-methyl-benzoyl chloride.

EXAMPLE 12

7-Chloro-5-phenyl-1-(p-methyl-benzoyl)-1H-1,5-benzodiazepine-2,4-[3H,5H]-dione, m.p. 194°–196° C., from 7-chloro-5-phenyl1H-1,5-benzodiozepine-2,4-[3H,5H]-dione and p-methyl-benzoyl chloride.

EXAMPLE 13

7-Chloro-5-phenyl-1-(o-fluoro-benzoyl)-1H-1,5-benzodiazepine-2,4-[3H,5H]-dione, m.p. 176°–178° C., of the formula

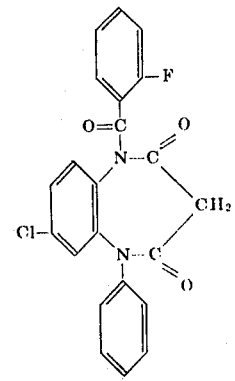

from 7-chloro-5-phenyl-1H-1,5-benzodiazepine-2,4-[3H,5H]-dione and o-fluoro-benzoyl chloride.

EXAMPLE 14

7Chloro-5-phenyl-1-(cyclohexyl-carbonyl)-1H-1,5-benzodiazepine-2,4-[3H,5H]-dione, m.p. 157°–159° C. of the formula

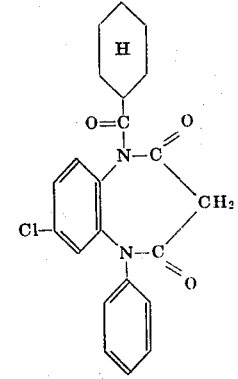

from 7-Chloro-5-phenyl-1H-1,5-benzodiazepine-2,4-[3H,5H]-dione and cyclohexyl-carbonyl chloride.

EXAMPLE 15

7-Chloro-5-phenyl-1-(o,p-dichloro-benzoyl)-1H-1,5-benzodiazepine-2,4-[3H,5H]-dione, m.p. 204°–205° C., of the formula

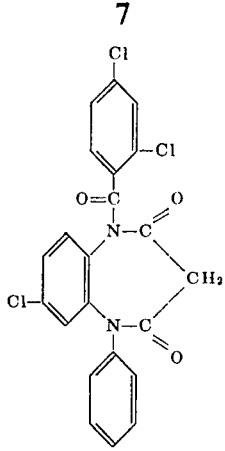

EXAMPLE 16

7Bromo-5-phenyl-1-benzoyl-1H-1,5-benzodiazepine-2,4-[3H,5H]-dione, m.p. 200°–201° C., of the formula

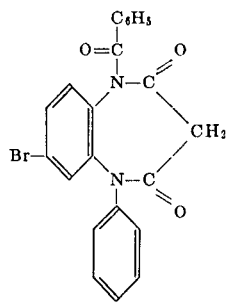

from 7-chloro-5-phenyl-1H-1,5-benzodiazepine-2,4-[3H,5H]-dione and benzoic acid anhydride.

EXAMPLE 17

7-Chloro-5-phenyl-1-chloroacetyl-1H-1,5-benzodiazepine-2,4-[3H,5H]-dione, m.p. 208°–209° C., of the formula

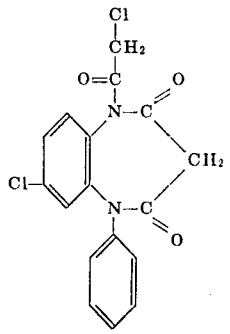

from 7-chloro-5-phenyl-1H-1,5-benzodiazepine-2,4-[3H,5H]-dione and chloroacetic acid anhydride.

EXAMPLE 18

7-Chloro-5-phenyl-1-cinnamoyl-1H-1,5benzodiazepine-[2,4-[3H,5H]-dione, m.p. 205°–206° C., of the formula

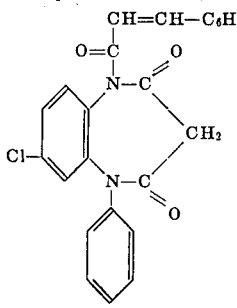

from 7-chloro-5-phenyl-1H-1,5-benzodiazepine-2,4-[3H,5H]-dione and cinnamoyl chloride.

EXAMPLE 19

8-Methyl-5-phenyl-1-benzoyl-1H-1,5-benzodiazepine-2,4-[3H,5H]-dione, m.p. 214°–216° C., of the formula

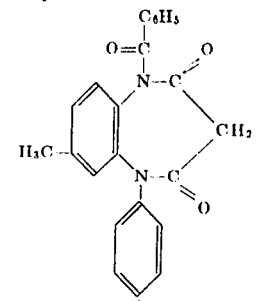

from 8-methyl-5-phenyl-1H-1,5-benzodiazepine-2,4-[3H,5H]-dione and benzoic acid anhydride.

EXAMPLE 20

5-(p-methoxy-phenyl)-1-benzoyl-1H-1,5-benzodiazepine-2,4-[3H,5H]-dione, m.p. 104°–106° C., of the formula

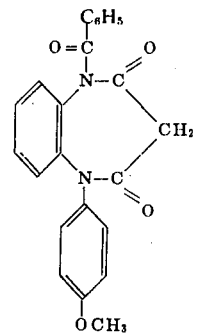

from 5-(p-methoxy-phenyl)-1H-1,5-benzodiazepine-2,4-[3H,5H]-dione and benzoic acid anhydride.

EXAMPLE 21

7-Chloro-5-(p-chloro-phenyl)-1-benzoyl-1H-1,5-benzodiazepine-2,4-[3H,5H]-dione, m.p. 243°–245° C., of the formula

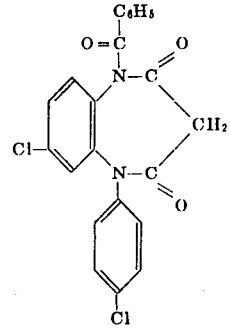

from 7-chloro-5-(p-chloro-phenyl)-1H-1,5-benzodiazepine-2,4-[3H,5H]-dione and benzoic acid anhydride.

EXAMPLE 22

7-Chloro-5-p-tolyl-1-benzoyl-1H-1,5-benzodiazepine-2,4-[3H,5H]-dione, m.p. 165°–168° C., of the formula

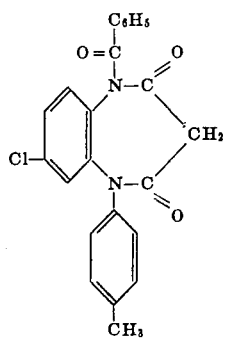

from 7-chloro-5-p-tolyl-1H-1,5-benzodiazepine-2,4-[3H,5H]-dione and benzoic acid anhydride.

EXAMPLE 23

7-Trifluoromethyl-5-phenyl-1-benzoyl-1H-1,5-benzodiazepine-2,4-[3H,5H]-dione, m.p. 176°–178° C., of the formula

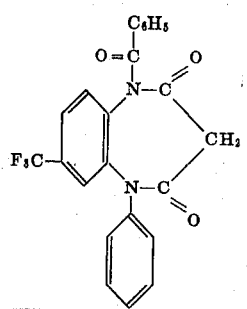

from 7-trifluoromethyl-5-phenyl-1H-1,5-benzodiazepine-2,4-[3H,5H]-dione and benzoic acid anhydride.

EXAMPLE 24

8-Trifluoromethyl-5-phenyl-1-benzoyl-1H-1,5-benzodiazepine-2,4-[3H,5H]-dione, m.p. 213°–215° C., from 8-trifluoromethyl-5-phenyl-1H-1,5-benzodiazepine-2,4-[3H,5HAY—DIONE AND BENZOIC ACID ANHYDRIDE)

EXAMPLE 25

7-Chloro-5-phenyl-1-phenylacetyl-1H-1,5-benzodiazepine-2,4-[3H,5H]-dione, m.p. 127°–129° C., of the formula

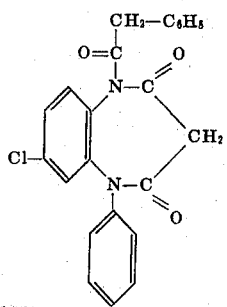

from 7-chloro-5-phenyl-1H-1,5-benzodiazepine-2,4-[3H,5H]-dione and phenylacetyl chloride.

EXAMPLE 27

7-Chloro-5-phenyl-1-(m,p-dimethoxy-benzoyl)-1H-1,5-benzodiazepine-2,4-[3H,5H]-dione, m.p. 134°–137° C., of the formula

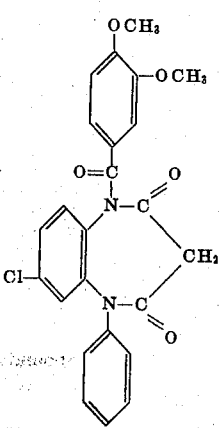

from 7-chloro-5-phenyl-1H-1,5-benzodiazepine-2,4-[3H,5H]-dione and m,p-dimethoxybenzoyl chloride.

EXAMPLE 28

7-Chloro-5-phenyl-1-(p-nitro-benzoyl)-1H-1,5-benzodiazepine-2,4-[3H,5H]-dione, m.p. 216°–218° C., of the formula

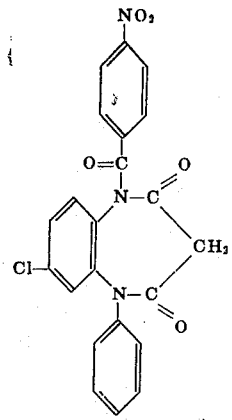

from 7-chloro-5-phenyl-1H-1,5-benzodiazepine-2,4-[3H,5H]-dione and p-nitro-benzoyl chloride.

EXAMPLE 29

7-Chloro-5-phenyl-1-(2'-thenoyl)-1H-1,5-benzodiazepine-2,4-[3H,5H]-dione, m.p. 210°–212° C., of the formula

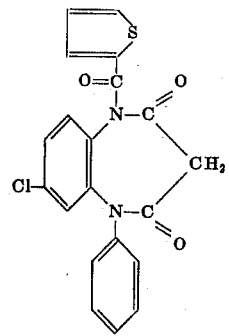

from 7-chloro-5-phenyl-1H-1,5-benzodiazepine-2,4-[3H,5H]-dione and 2-thenoyl chloride.

EXAMPLE 30

7Chloro-5-phenyl-1-(2'-furoyl)-1H-1,5-benzodiazepine-2,4-[3H,5H]-dione, m.p. 228°–230° C., of the formula

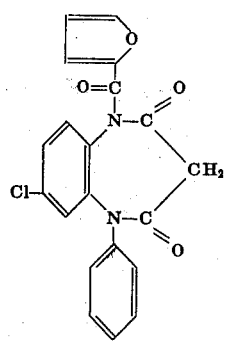

from 7-chloro-5-phenyl-1H-1,5-benzodiazepine-2,4-[3H,5H]-dione and 2-furoyl chloride.

EXAMPLE 31

7-Chloro-5-phenyl-1-acetyl-1H-1,5-benzodiazepine-2,4-[3H,5H]-dione, m.p. 201°–203° C., of the formula

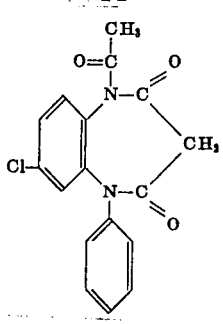

from 7-chloro-5-phenyl-1H-1,5-benzodiazepine-2,4-[3H,5H]-dione and acetic acid anhydride.

EXAMPLE 32

7-Chloro-5-phenyl-1-trifluoroacetyl-1H-1,5-benzodiazepine-2,4-[3H,5H]-dione, m.p. 173°–175° C., of the formula

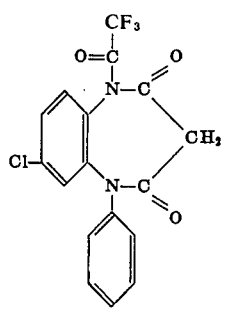

from 7-chloro-5-phenyl-1H-1,5-benzodiazepine-2,4-[3H,5H]-dione and trifluoroacetic acid chloride.

EXAMPLE 33

7-Chloro-5-phenyl-1-lauroyl-1H-1,5-benzodiazepine-2,4-[3H,5H]-dione, m.p. 89°–91° C., of the formula

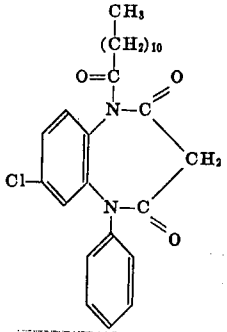

from 7-chloro-5-phenyl-1H-1,5-benzodiazepine-2,4-[3H,5H]-dione and lauroyl chloride.

EXAMPLE 34

7-Chloro-5-phenyl-1-palmitoyl-1H-1,5-benzodiazepine-2,4-[3H,5H]-dione, m.p. 78°–80° C., of the formula

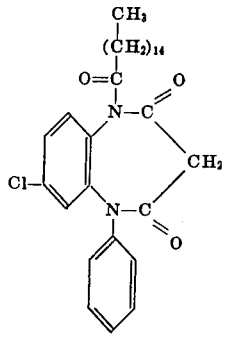

from 7-chloro-5-phenyl-1H-1,5-benzodiazepine-2,4-[3H,5H]-dione and palmitic acid chloride.

The compounds according to the present invention, that is, those embraced by formula I above, have useful pharmacodynamic properties. More particularly, the compounds of the present invention exhibit psychosedative, muscle-relaxing and anticonvulsive activities and very low toxicity in warm-blooded animals, such as mice, rats, cats, rabbits and dogs. The psychosedative, muscle-relaxing and anticonvulsive activities of the compounds embraced by formula I were ascertained by standard pharmacological tests on laboratory animals. Compounds wherein $R_1$ is phenyl, substituted phenyl, phenyl-acetyl, cyclohexyl, alkyl of one to 15 carbon atoms, chloromethyl or hydrogen, $R_2$ is hydrogen, and $R_3$ is halogen or trifluoromethyl in seven-position have proved to be particularly effective. More specifically, the following compounds have been found to be especially useful:

1 benzoyl-7-chloro-5-phenyl-1H-1,5-benzodiazepine-2,4-[3H,5H]-dione,
7-chloro-1-cyclohexylcarbonyl-5-phenyl-1H-1,5-benzodiazepine-2,4-[3H,5H]-dione,
7-chloro-1-chloroacetyl-5-phenyl-1H-1,5-benzodiazepine-2,4-[3H,5H]-dione,
1-benzoyl-5-phenyl-7-trifluoromethyl-1H-1,5-benzodiazepine-2,4-[3H,5H]-dione,
7-chloro-1propionyl- 5-phenyl-1H-1,5-benzodiazepine-2,4-[3H,5H]-dione,
7-chloro-1-formyl-5-phenyl-1H-1,5-benzodiazepine-2,4-[3H,5H]-dione,
7-chloro-1-phenylacetyl-5-phenyl-1H-1,5-benzodiazepine-2,4-[3H,5H]-dione,
7-chloro-1-(3,4-dimethoxybenzoyl)-5-phenyl-1H-1,5-benzodiazepine-2,4-[3H,5H]-dione,
7-chloro-1-(4-methylbenzoyl)-5-phenyl-1H-1,5-benzodiazepine-2,4-[3H,5H]-dione,
7-chloro-1-(2-fluorobenzoyl)-5-phenyl-1H-1,5-benzodiazepine-2,4-[3H,5H]-dione,
7-chloro-1-(4-nitrobenzoyl)-5-phenyl-1H-1,5-benzodiazepine-2,4-[3H,5H]-dione,
1-acetyl-7-chloro-5-phenyl-1H-1,5-benzodiazepine-2,4-[3H,5H]-dione,
1-benzoyl-7-bromo-5-phenyl-1H-1,5-benzodiazepine-2,4-[3H,5H]-dione,
7-chloro-1-lauroyl-5-phenyl-1H-1,5benzodiazepine-2,4-[3H,5H]-dione, and
7-chloro-1-palmitoyl-5-phenyl-1H-1,5-benzodiazepine-2,4-[3H,5H]-dione.

For pharmaceutical purposes the compounds according to the present invention are administered to warm-blooded animals perorally or parenterally as active ingredients in customary dosage unit compositions, that is, compositions in dosage unit form consisting essentially of an inert pharmaceutical carrier and one effective dosage unit of the active ingredient such as tablets, coated pills, capsules, wafers, powders, solutions, suspensions, emulsions, syrups, suppositories and the like. One effective dosage unit of the compounds according to the present invention is from 0.0166 to 0.84 mg./kg. body weight, preferably 0.083 to 0.42 mg./kg. body weight. The daily dose is from 0.166 to 2.5 mg./kg.

The following examples illustrate a few dosage unit compositions comprising a compound of the instant invention as an active ingredient and represent the best mode contemplated of putting the invention to practical use. The parts are parts by weight unless otherwise specified.

EXAMPLE 35

Tablets

The tablet composition was compounded from the following ingredients:

| | |
|---|---|
| 1-Benzoyl-7-chloro-5-phenyl-1H-1,5-benzodiazepine-2,4-[3H,5H]-dione | 10 parts |
| Lactose | 33 parts |
| Corn starch | 30 parts Colloidal silicic |

| Colloidal silicic acid | 1 part |
| Magnesium stearate | 1 part |
| Total | 75 parts |

Compounding procedure

The lactose, the corn starch and the colloidal silicic acid were thoroughly admixed with each other, the mixture was granulated with the aid of a soluble starch paste, the benzodiazepinedione compound and the magnesium stearate were admixed with the granulate, and the composition was compressed into 75 mg. tablets. Each tablet contained 10 mg. of the benzodiazepinedione compound and, when administered perorally to a warm-blooded animal of about 60 kg. body weight in need of such treatment, produced very good psychosedative, muscle-relaxing and anticonvulsive effects.

Analogous results were obtained when an equal amount of 7-chloro-1-cyclohexylcarbonyl-5-phenyl-1H-1,5-benzodiazepine-2,4-[3H,5H]-dione, 7-chloro-1-chloroacetyl-5-phenyl-1H-1,5-benzodiazepine-2,4-[3H,5H]-dione, 7-chloro-1-lauroyl-5-phenyl-1H-1,5-benzodiazepine-3H,5HAY—DIONE( 7-chloro-5-phenyl-1-propionyl-1H-1,5-benzodiazepine-2,4-[3H,5H]-dione, 7-chloro-1-formyl-5-phenyl-1H-1,5-benzodiazepine-2,4-[3H,5H]-dione, 7-chloro-1-phenylacetyl-5-phenyl-1H-1,5-benzodiazepine-2,4-[3H,5H]-dione, 7-chloro-1-(3,4-dimethoxybenzoyl)-5-phenyl-1H-1,5benzodiazepine-2,4-[3H,5H]-dione or any one of the other compounds embraced by formula I above was substituted for the particular benzodiazepinedione compounds example 35. Likewise, the amount of active ingredient in these examples may be varied to achieve the dosage unit range set forth above, and the amounts and nature of the inert pharmaceutical carrier ingredients may be varied to meet particular requirements.

We claim:

1. A compound of the formula

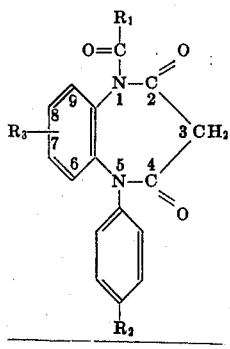

wherein $R_1$ is hydrogen, straight-chain alkyl of one to 15 carbon atoms, chloromethyl, trifluoromethyl, methylamino, ethoxy, cyclohexyl, phenyl, chlorophenyl, dichlorophenyl, tolyl, dimethoxyphenyl, nitrophenyl, benzyl, styryl, thienyl or furyl, $R_2$ is hydrogen, methyl, chlorine or methoxy, and $R_3$ is hydrogen, 7-chloro, 7-bromo, 8-methyl, 7-trifluoromethyl or 8-trifluoromethyl.

2. A compound of the formula

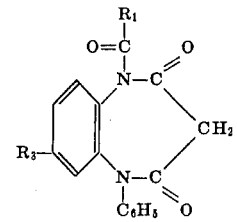

wherein $R_1$ is hydrogen, straight-chain alkyl of one to 15 carbon atoms, chloromethyl, phenyl, 4-methylphenyl, 3,4-dimethoxyphenyl, 2-fluorophenyl, 4-nitrophenyl, benzyl or cyclohexyl, and $R_3$ is hydrogen, chlorine, bromine or trifluoromethyl.

3. A compound according to claim 2, wherein $R_1$ is phenyl and $R_3$ is chlorine.

4. A compound according to claim 2, wherein $R_1$ is cyclohexyl and $R_3$ is chlorine.

5. A compound according to claim 2, wherein $R_1$ is chloromethyl and $R_3$ is chlorine.

6. A compound according to claim 2, wherein $R_1$ is phenyl and $R_3$ is trifluoromethyl.

7. A compound according to claim 2, wherein $R_1$ is ethyl and $R_3$ is chlorine.

8. A compound according to claim 2, wherein $R_1$ is hydrogen and $R_3$ is chlorine.

9. A compound according to claim 2, wherein $R_1$ is benzyl and $R_3$ is chlorine.

10. A compound according to claim 2, wherein $R_1$ is 3,4-dimethoxyphenyl and $R_3$ is chlorine.

11. A compound according to claim 2, wherein $R_1$ is 4methylphenyl and $R_3$ is chlorine.

12. A compound according to claim 2, wherein $R_1$ is 2-fluorophenyl and $R_3$ is chlorine.

13. A compound according to claim 2, wherein $R_1$ is 4-nitrophenyl and $R_3$ is chlorine.

14. A compound according to claim 2, wherein $R_1$ is methyl and $R_3$ is chlorine.

15. A compound according to claim 2, wherein $R_1$ is phenyl and $R_3$ is bromine.

16. A compound according to claim 2, wherein $R_1$ is lauryl and $R_3$ is chlorine.

17. A compound according to claim 2, wherein $R_1$ is palmityl and $R_3$ is chlorine.

* * * * *

PO-1050
(5/69)

UNITED STATES PATENT OFFICE
CERTIFICATE OF CORRECTION

Patent No. 3,624,076                 Dated November 30, 1971

Inventor(s) KARL-H. WEBER, KARL ZEILE, ROLF GIESEMANN and PETER B. DANNEBERG

It is certified that error appears in the above-identified patent and that said Letters Patent are hereby corrected as shown below:

Col. 1, line 33, cancel "ps".
 "   2,  "   24, change "3H,5" to --3H,5H--;
        "   26, insert -- -[ -- before "3H";
        "   43, correct the spelling of "benzodiazepine";
        "   58, change "[3H,a5H]" to --[3H,5H]--.
Col. 3, line 53, change "mineral oil" to --tetrahydrofuran--;
        "   59, correct the spelling of "benzoyl";
Col. 4, line 5, change "[3H,5]" to --[3H,5H]--
Col. 5, line 15, change "ethoxycarboxyl" to --ethoxycarbonyl--;
 "       "   76, change "°C" to --200°C--.
Col. 6, line 17, correct the spelling of "benzodiazepine--;
 "       "   24,    "        "      "     "      "
Col. 7, line 61, erase the bracket before "2".
Col. 9, line 29, change "3H,5HAY" to --[3H,5H]--.

Col. 12, line 76, erase "Colloidal silicic".

Col. 13, line 22, change "3H,5HAY-DIONE(" to --[3H,5H]-dione;

Signed and sealed this 6th day of June 1972.

(SEAL)
Attest:

EDWARD M. FLETCHER, JR.            ROBERT GOTTSCHALK
Attesting Officer                  Commissioner of Patents